United States Patent [19]

Yateman et al.

[11] 4,136,768
[45] Jan. 30, 1979

[54] SHAFT RETAINER ARRANGEMENT

[75] Inventors: Earl W. Yateman; Gerald D. Sanderson, both of Belleville, Canada

[73] Assignee: Allis-Chalmers Canada, Limited, Lachine, Canada

[21] Appl. No.: 835,710

[22] Filed: Sep. 22, 1977

[51] Int. Cl.² .............................................. B65G 39/12
[52] U.S. Cl. ...................................... 198/830; 85/8.8; 193/37; 308/DIG. 11; 403/155; 403/357
[58] Field of Search ............... 198/780, 824, 825, 826, 198/827, 828, 829, 830, 842, 861; 193/35 R, 37; 403/240, 241, 315, 319, 326, 327, 355, 357, 358; 308/20, DIG. 11; 24/257; 85/8.8; 403/154, 155

[56] References Cited

U.S. PATENT DOCUMENTS

| | | | |
|---|---|---|---|
| 1,111,474 | 9/1914 | Lenfestey | 193/37 |
| 2,066,383 | 1/1937 | Andrada | 198/830 |
| 2,144,553 | 1/1939 | Simmonds | 85/8.8 |
| 2,646,713 | 7/1953 | Summerbell | 308/DIG. 11 |
| 2,696,283 | 12/1954 | Barry | 193/35 R |
| 2,781,962 | 2/1957 | Wilder, Jr. | 403/319 |
| 2,843,432 | 7/1958 | Kindig | 198/830 |
| 2,895,754 | 7/1959 | Wurzel | 403/355 |
| 3,002,792 | 10/1961 | Sekulski | 308/20 |
| 3,157,272 | 11/1964 | Bay | 198/842 |
| 3,934,711 | 1/1976 | Coutant | 198/830 |

FOREIGN PATENT DOCUMENTS

| | | | |
|---|---|---|---|
| 861669 | 11/1952 | Fed. Rep. of Germany | 198/830 |
| 72471 | 4/1960 | France | 193/37 |
| 419968 | 11/1934 | United Kingdom | 403/154 |

Primary Examiner—Robert B. Reeves
Assistant Examiner—Richard K. Thomson
Attorney, Agent, or Firm—Robert C. Sullivan

[57] ABSTRACT

A retainer arrangement for a stationary shaft, rod or the like for retaining the shaft against upward movement in an upwardly open recess or slot of a support bracket, and the combination of the retainer with the shaft and with the support bracket. The retainer arrangement comprises a retention spring clip which encircles a substantial portion, such as 270°, of the shaft periphery contiguous the supported end of the shaft. The upper portion of the retention spring clip is formed to include opposite laterally spaced axially extending lugs which are adapted to snap each into a corresponding retention groove carried by the respective opposite recess-bounding walls of the support bracket when the shaft is seated in the upwardly open recess or slot of the support bracket. With the lugs of the retention spring clip engaged with the oppositely disposed retention grooves of the support bracket, the lugs are in axially overlying relation to oppositely disposed upper surface portions of the shaft, whereby to prevent upward movement of the shaft out of its seated position.

24 Claims, 3 Drawing Figures

U.S. Patent    Jan. 30, 1979    4,136,768

SHAFT RETAINER ARRANGEMENT

BACKGROUND OF THE INVENTION

This invention relates to an arrangement for retaining in position a stationary shaft in a support frame or bracket. The retaining arrangement of the invention may be used, for example, for retaining in position the stationary shaft of a belt conveyor idler roll and will be described as embodied in the environment of a belt conveyor idler roll shaft, but is not restricted to such use.

DESCRIPTION OF THE PRIOR ART

A number of various arrangements are disclosed in the prior art for retaining the end of a stationary shaft, such as the stationary shaft of a belt conveyor idler roll, in a support frame. The following United States patents are illustrative of the prior art relating to hold down or retaining arrangements for the shafts of idler rolls or the like: 1,292,799 issued to M. A. Kendall on Jan. 28, 1919; 2,586,270 issued to S. J. Spurgeon on Feb. 19, 1952; 2,843,432 issued to A. J. Kindig on July 15, 1958; 2,869,710 issued to E. C. Stewart on Jan. 20, 1959; 3,002,792 issued to L. E. Sekulski on Oct. 3, 1961; 3,157,272 issued to J. Bay on Nov. 17, 1964; 3,545,602 issued to M. B. McCullagh on Dec. 8, 1970; 3,934,711 issued to R. W. Coutant on Jan. 27, 1976; and 3,946,858 issued to D. J. Diantonio on Mar. 30, 1976.

STATEMENT OF THE INVENTION

It is an object of the present invention to provide a retainer arrangement for retaining the opposite ends of a fixed or stationary shaft in a supporting frame or bracket in accordance with which the retaining means is easy to install and to remove.

It is another object of the invention to provide a retention arrangement or device for retaining a stationary shaft in an upwardly open recess or slot of a supporting frame or bracket in such manner that there is very little chance of mechanical failure of the retaining device which would permit the retained shaft to rise up out of the shaft retaining recess of the supporting frame or bracket and become detached from the support bracket.

It is still a further object of the invention to provide a retaining arrangement or device for retaining a stationary shaft with respect to a supporting frame which is particularly appropriate for use in retaining the stationary shaft of a belt conveyor idler roll in position with respect to a support bracket, although not restricted to such use.

It is a further object of the invention to provide a retaining arrangement for the end of a stationary shaft supported by a support frame bracket in accordance with which the retaining arrangement comprises a retention spring clip which is so constructed and which is so related to the shaft being supported and to the support bracket or frame for the shaft as to reduce to a minimum the chance of the retention spring clip becoming detached from the shaft and from the supporting frame bracket, and thus also reducing to a minimum the chance of the retention spring clip becoming lost after installation of the shaft onto the support bracket.

In achievement of these objectives, there is provided in accordance with an embodiment of the invention a retainer arrangement for a stationary shaft, rod or the like for retaining the shaft against upward movement in an upwardly open recess or slot of a support bracket, and the combination of the retainer with the shaft and with the support bracket. The retainer arrangement comprises a retention spring clip which encircles a substantial portion, such as 270°, of the shaft periphery contiguous the supported end of the shaft. The upper portion of the retention spring clip is formed to include opposite laterally spaced axially extending lugs which are adapted to snap each into a corresponding retention groove carried by the respective opposite recess-bounding walls of the support bracket when the shaft is seated in the upwardly open recess or slot of the support bracket. With the lugs of the retention spring clip engaged with the oppositely disposed retention grooves of the support bracket, the lugs are in axially overlying relation to oppositely disposed upper surface portions of the shaft, whereby to prevent upward movement of the shaft out of its seated position.

Further objects and advantages of the invention will become apparent from the following description taken in conjunction with accompanying drawing in which:

DESCRIPTION OF THE PREFERRED EMBODIMENT

Figure 1:
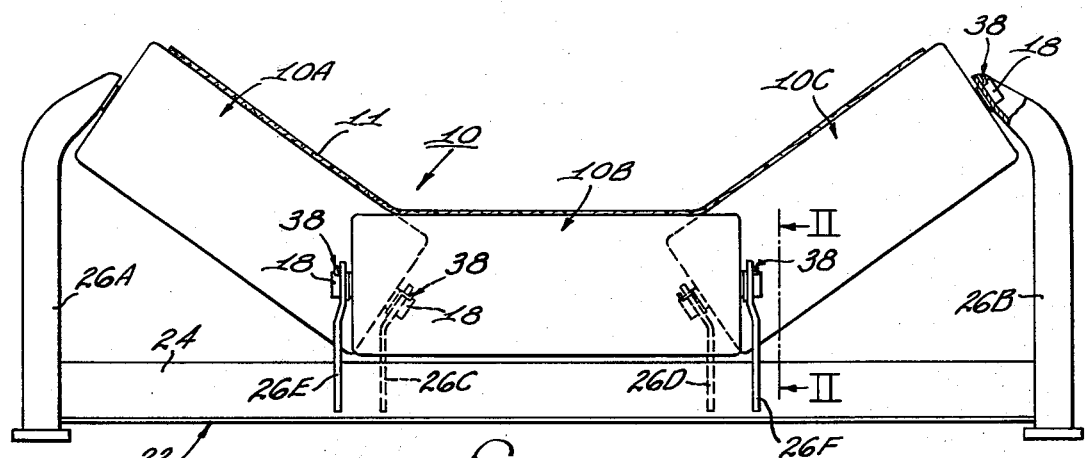
FIG. 1 is a view in vertical elevation of the idler rolls for a troughing conveyor of the offset center roll type, in which each of the idler rolls is supported at its opposite ends by separate support brackets, and in which the opposite ends of the stationary shaft of each idler roll are retained in position in their corresponding support brackets by the retaining arrangement of the present invention.

Referring now to the drawing and more particularly to FIG. 1, there is shown an arrangement of three idler roll assemblies generally indicated at 10 and specifically designated as 10A, 10B and 10C which are arranged to define a trough-like support for the upper run of a conveyor belt 11. In the illustrated embodiment, the center idler roll assembly 10B lies in a plane forwardly of or "offset" from the common plane in which the two outer idler roll assemblies 10A and 10C lie, the offset position of center idler roll assembly 10B relative to outer idler roll assemblies 10A, 10C eliminating the gap between the more conventional in-line rolls of the general type shown for example, by U.S. Pats. 3,934,711 of R. W. Coutant and 3,946,858 of D. J. Diantonio. Each of the idler roll assemblies 10A, 10B and 10C comprises a stationary shaft 18 about which a roll generally indicated at 16 is mounted for rotation by means of a pair of spaced bearing assemblies such as a pair of tapered roller bearing assemblies 20, for example, (only one of which is shown) respectively positioned contiguous but spaced axially inwardly of the opposite ends of shaft 18. A seal 21 is provided at each end of each idler roll assembly 10 contiguous and outboard of the corresponding bearing 20.

Each end of shaft 18 is provided with oppositely disposed groove-like portions 18A defined by a flat surface 18B which is adapted to abut a corresponding one of the oppositely disposed walls 30 of the upwardly open recess or slot 28 of the corresponding support bracket such as 26F or 26E, to be described, whereby to prevent rotation of stationary shaft 18 relative to support bracket 26F or 26E.

A support frame generally indicated at 22 is provided and includes a horizontal base member 24 having secured at the opposite ends thereof upright support or bracket members 26A and 26B which respectively support the outer ends of the respective shafts 18 associated with the respective outer idler roll assemblies 10A and 10C. The laterally inner ends of the shafts 18 of the respective idler roll assemblies 10A and 10C are supported by support or bracket members 26C and 26D, respectively, which are rigidly secured at the lower ends thereof to horizontal base member 24. The two opposite ends of shaft 18 of center idler roll assembly 10B are supported by bracket members 26E and 26F, respectively. Support brackets 26E and 26F are rigidly secured at their lower ends to horizontal base member 24 and are inclined forwardly from the horizontal base member 24 relative to the view of FIG. 1 whereby to support center idler roll assembly 10B in a vertical plane which lies forwardly of the vertical plane in which outer idler roll assemblies 10A and 10C lie.

Each of the support brackets 26A-26F, inclusive, is provided at the upper end thereof with a shaft support and shaft retaining arrangement which is similar to that provided by each of the other support brackets 26A-26F, inclusive, and hence the description of the shaft support and shaft retaining arrangement provided between one support bracket 26F and the end of the corresponding idler roll shaft 18 will be illustrative of the shaft support and retaining arrangement provided at all of the other support brackets.

Figures 2, 3:
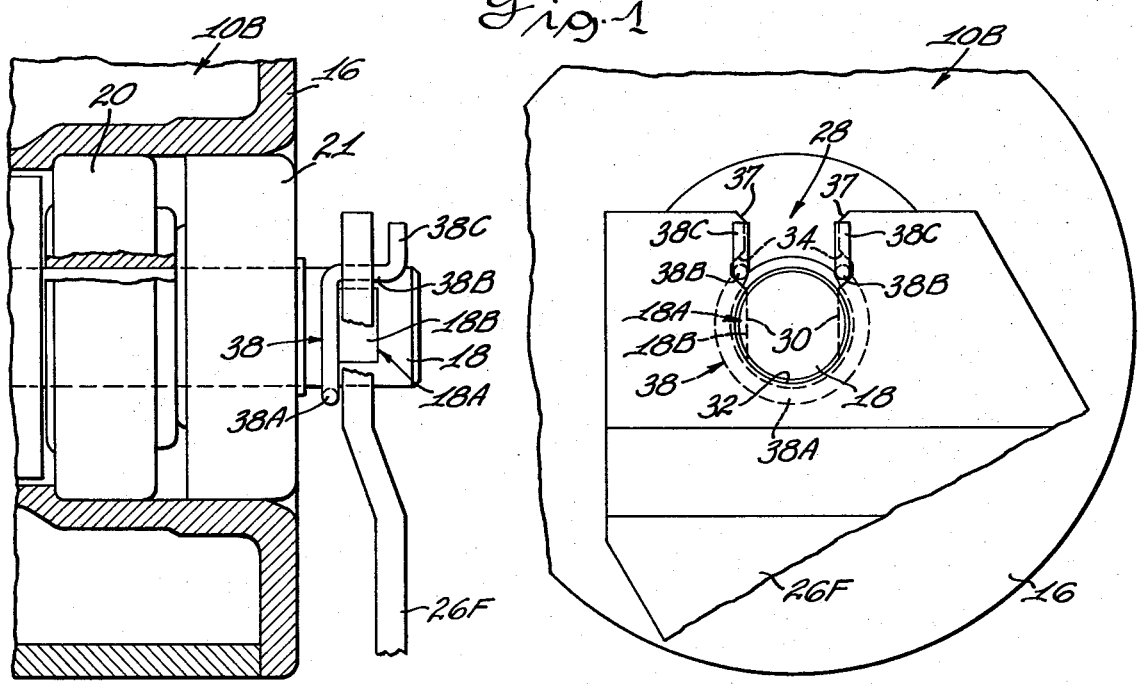
FIG. 2 is a view taken in vertical section along line II—II of FIG. 1.
FIG. 3 is an enlarged view, partially in section and partially in elevation, showing one end of an idler roll having the shaft thereof received by the upwardly open recess or slot of the shaft support bracket, with the idler roll being held in place in the upwardly open recess slot of the support bracket by the spring clip retention device of the present invention.

Referring now to FIGS. 2 and 3, there is shown the support bracket 26F supporting the right-hand end of center idler roll assembly 10B relative to the view shown in FIG. 1 of the drawing. Support bracket 26F is provided with an upwardly open shaft-receiving recess or slot generally indicated at 28. The laterally opposite sides of upwardly open recess 28 are bounded by opposite flat side walls 30 which extend downwardly to a rounded bottom surface 32. Rounded bottom surface 32 of recess 28 has a radius adapted to serve as a seat for the rounded under surface of shaft 18 when shaft 18 is received in recess 28. Each of the opposite bounding edges or walls 30 of upwardly open recess 28 are provided in the upper portion thereof with a retention groove or slot 34, the two oppositely disposed grooves 34 lying in a common horizontal plane with each other. In the illustrated embodiment, each groove 34 is so vertically positioned that the centerline of the oppositely disposed grooves 34 lies in a horizontal plane which is substantially at a vertical level slightly below the outer circumference of shaft 18 when shaft 18 is properly seated in the upwardly open recess 28 as best seen in the views of FIGS. 2 and 3. Opposite side walls 30 of the upwardly open recess 28 are preferably bevelled at the corresponding upper ends thereof as indicated at 37 to provide cam surfaces at the mouth of support bracket recess or slot 28 to facilitate the entry of lug portions 38B of retainer clip 38 into recess or slot 28 of support bracket 26F, as will be explained hereinafter.

A spring wire retainer or retention clip generally indicated at 38 is slipped over each end of shaft 18 before idler roll assembly 10B is placed in position in support brackets 26E and 26F. Retainer clip 38 is made of a spring-like material such as piano wire or the like and includes a circumferentially extending portion 38A which in the illustrated embodiment extends in underlying relation to shaft 18 for substantially 270° of the cylindrical periphery of shaft 18.

The inner diameter of circumferentially or arcuately extending portion 38A of clip 38 should be sufficiently greater than the outer diameter of shaft 18 which lies radially inwardly of circumferentially extending clip portion 38A to provide sufficient slack in arcuate portion 38A to permit upstanding portions 38C of clip 38 to move laterally inwardly toward each other sufficiently for lug portions 38B of the retainer clip to be able to clear the mouth of bracket recess or slot 28 and to be able to move lengthwise along the interior of bracket recess 28 during the installation of or during the removal of shaft 18. In other words, circumferentially extending portion 38C of retainer clip 38 should have a relatively "loose fit" with respect to the outer diameter of shaft 18.

Retainer clip 38 is bent at the upper opposite ends of circumferentially extending portion 38A to include two opposite laterally spaced lug portions 38B which extend in the same direction as each other and parallel to each other and in a direction axially of shaft 18. Clip 38 is bent at the axially outer end of each of the lug portions 38B to include an upstanding end portion each respectively indicated at 38C which extends substantially perpendicularly to the axially extending lug portion 38B. In the case of center idler roll assembly 10B, since shaft 18 is horizontal, lug portions 38B of retainer clip 38 extend horizontally and clip end portions 38C extend vertically.

Retainer clip 38 is so positioned on the end of shaft 18 that circumferentially extending portion 38A of clip 38 lies a short distance inboard, or to the left with respect to the view of FIG. 3, of the oppositely disposed grooves 18A of shaft 18. The axial length of each retaining lug portion 38B of retainer clip 38 is sufficient to extend from its connection to circumferential portion 38A of retainer clip 38 to a location axially outboard, or to the right relative to the view of FIG. 3, of oppositely disposed grooves 18A of shaft 18.

With a retainer clip 38 positioned on each end of shaft 18 in the position shown in the view of FIG. 3, the end portions of the shaft having the grooved portions 18A having the flat surfaces 18B are pushed downwardly into the upwardly open recesses or slots 28 of oppositely disposed support brackets 26E and 26F until shaft 18 is fully seated in the recess or slot 28 of each respective bracket 26E, 26F, as best seen in the views of FIGS. 2 and 3. With the opposite ends of shaft 18 seated in the upwardly open recesses or slots 28, the flat surface portions 18B of the oppositely disposed grooves 18A in each end of the shaft abut the flat edges 30 of the corresponding bracket slot 28 to prevent any rotation of shaft 18 relative to the support bracket.

When shaft 18 is pushed downwardly into the upwardly open slots or recesses 28, as just mentioned, the oppositely disposed lug portions 38B of each of the retainer clips 36 are at first cammed laterally inwardly by the opposite bevelled surfaces 37 of the upper end or mouth of recess or slot 28, lugs 38B then moving downwardly into the slot 28, with each lug portion 38B snapping into a corresponding one of the oppositely disposed retention grooves 34 of the respective support brackets 26E, 26F. Although the surfaces of opposite side walls 30 at the mouth of upwardly open recess or slot 28 of the support bracket are preferably bevelled as indicated at 37 in FIG. 2 to provide the camming action just described, if the bevelled cam surfaces 37 are not provided at the mouth of bracket recess or slot 28, the entry of lugs 38B of retainer clip 38 into recess or slot 28 of the support bracket when shaft 18 is being positioned in recess 28 of the respective support brackets may be facilitated by "squeezing" the oppositely disposed upstanding end portions 38C of retainer clip 38 toward each other, either by hand or with a suitable tool such as pliers.

With shaft 18 and the associated retainer spring clip 38 assembled with respect to support bracket 26F as best seen in the view of FIG. 3, shaft 18 is retained in the seated position shown in upwardly open recess 28 of support bracket 26F by oppositely disposed lug portions 38B of the retainer clip 38. In the assembled position of shaft 18 and retainer clip 38 in support bracket 26F shown in the views of FIGS. 2 and 3, it will be seen that each of the axially extending lug portions 38B of retainer clip 38 overlies the upper portion of the cylindrical surface of shaft 18 which lies axially on either side of the corresponding flat groove portion 18A in shaft 18. As a result of the overlying relation of the oppositely disposed lug portions 38B relative to the underlying cylindrical surface portions of shaft 18, in order for shaft 18 to rise upwardly out of the outwardly open recess 28 of support bracket 26F in the installed position of shaft 18 and retainer clip 38 seen in FIGS. 2 and 3, it would be necessary for the cylindrical portions of shaft 18 lying axially on either side of each respective shaft groove 18A to shear off the spring lug portions 38B, which would be a very unlikely occurrence.

If it is desired to remove shaft 18 from its assembled position with respect to bracket 26F, the laterally oppositely disposed upstanding end portions 38C of retainer clip 38 are squeezed toward each other either by hand or with a suitable tool such as pliers to draw axially extending lug portions 38B laterally outwardly from oppositely disposed retention grooves 34 in support bracket 26F. Shaft 18 and the associated retainer clip 38 may then be withdrawn out of the upwardly open shaft retaining recess 28 of support bracket 26F.

In addition to their use in facilitating movement of retainer clip lug portions 38B out of oppositely disposed retention grooves 34 in support bracket 26F as just mentioned, upstanding portions 38C of retainer clip 38 also perform the further important function of serving as abutments which serve to properly axially position or locate the retainer clip on shaft 18, thereby maintaining clip 38 in properly assembled relation with respect to shaft 18 and the support bracket. As previously mentioned, retainer clip 38 has a loose fit on shaft 18, and therefore might tend to slide axially to the left relative to the view of FIG. 3 along shaft 18 to such an extent as to possibly cause retainer clip 38 to abut against seal 21, which would be undesirable. However, the upstanding retainer clip portions 38C limit the axial displacement of retainer clip 38 in an axially inwardly direction (or to the left relative to the view of FIG. 3), since when upstanding portions 38C move into abutting relation to the surface of support bracket 26F, further axial movement of retainer clip 38 in an axially inward direction is prevented.

While the invention has been illustrated and described as embodied for use with a conveyor belt troughing idler roll arrangement of the offset center roller type, it will be understood that this is only illustrative, and that the invention may also be embodied in other types of idler roll arrangements, and also in other arrangements where it is necessary to retain a shaft in an upwardly open recess of a support bracket or frame.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In combination, a stationary shaft, a support bracket for an end of said shaft, an upwardly open recess in said support bracket for supportingly receiving said shaft contiguous an end of said shaft, a retention groove in each of the oppositely disposed bounding walls of said recess contiguous the upper portion of each of said opposite walls, a retention clip formed of spring-like material for retaining said shaft against upward movement in said upwardly open recess when said shaft is positioned in said recess, said retention clip comprising an arcuate portion positioned in encircling relation to a portion of the periphery of said shaft, said retention clip comprising a pair of laterally spaced lug portions respectively extending in a direction axially of said shaft from circumferentially opposite ends of said arcuate portion of said retention clip, said lug portions snapping into the respective retention grooves of said oppositely disposed bounding walls of said recess when said shaft is positioned in said recess, whereby said lug portions of said retention clip axially overlie oppositely positioned upper surface portions of said shaft when said shaft is positioned in said recess to thereby prevent upward movement of said shaft in said recess.

2. The combination defined in claim 1 in which the portion of the periphery of said shaft about which said arcuate portion of said retainer clip is positioned in encircling relation includes and exceeds the lower half of said shaft.

3. The combination defined in claim 2 in which said arcuate portion extends for approximately 270° about the periphery of said shaft.

4. The combination defined in claim 1 in which the inner diameter of said arcuate portion of said retainer clip is so dimensioned relative to the outer diameter of said shaft that said retainer clip has a "loose fit" on said shaft, whereby to provide sufficient slack in said arcuate portion of said retainer clip to permit said lug portions of said clip to move laterally inwardly toward each other sufficiently to be able to move lengthwise along the interior of said upwardly open recess of said support bracket in either an inward or an outward direction relative to said recess and to clear the mouth of said recess upon the installation of or removal of said shaft and said retainer clip relative to said support bracket.

5. The combination defined in claim 1 in which diametrically opposite portions of said end portion of said shaft are grooved to include a flat surface portion, and each of said oppositely disposed bounding walls of said upwardly open recess of said support bracket includes a flat surface adapted to abut a corresponding flat surface of a groove in said shaft, whereby to prevent rotation of said shaft in said upwardly open recess.

6. The combination defined in claim 5 in which said retention clip is so located on said shaft that when said shaft is positioned in said upwardly open recess of said support bracket said arcuate portion of said retention clip is located on one axial side of said support bracket, and said lug portions extend from said arcuate portion axially of said shaft across said support bracket within said retention grooves and to the other axial side of said support bracket, said lug portions being in overlying and retaining relation to said shaft both inboard of and outboard of said support bracket.

7. The combination defined in claim 1 in which the surfaces of said support bracket at the mouth of said upwardly open recess are bevelled to define cam surfaces which cam said laterally spaced lug portions of said retention clip laterally inwardly toward each other and into said upwardly open recess upon the installation of said shaft and of said retainer clip relative to said support bracket.

8. The combination defined in claim 1 in which each of said axially extending lug portions includes abutment means engageable with said support bracket whereby to locate said retention clip at a predetermined region on said shaft by limiting any axial movement of said retention clip along said shaft to a predetermined distance.

9. The combination defined in claim 1 in which each of said lug portions is provided with an upstanding portion, the upstanding portions of the two laterally spaced lug portions being squeezable to move said lug portions laterally inwardly toward each other sufficiently to permit said lug portions to move lengthwise along the interior of said upwardly open recess in either an inward or an outward direction relative to said recess and to clear the mouth of said recess upon the installation of or removal of said shaft and said retainer clip relative to said support bracket.

10. The combination defined in claim 1 in which said stationary shaft is the shaft of a belt conveyor idler roll assembly.

11. In combination, a stationary shaft, a support bracket for an end of said shaft, an upwardly open recess in said support bracket for supportingly receiving said shaft contiguous an end of said shaft, a retention groove in each of the oppositely disposed bounding walls of said recess contiguous the upper portion of each of said opposite walls, a retention clip formed of spring-like material for retaining said shaft against upward movement in said upwardly open recess when said shaft is positioned in said recess, said retention clip comprising an arcuate portion positioned in encircling relation to a portion of the periphery of said shaft, said retention clip comprising a pair of laterally spaced lug portions respectively extending in a direction axially of said shaft from the opposite ends of said arcuate portion of said retention clip, said lug portions snapping into the respective retention grooves of said oppositely disposed bounding walls of said recess when said shaft is positioned in said recess, whereby said lug portions of said retention clip axially overlie oppositely positioned upper surface portions of said shaft when said shaft is positioned in said recess to thereby prevent upward movement of said shaft in said recess, diametrically opposite portions of said end portion of said shaft being grooved to include a flat surface portion, each of said oppositely disposed bounding walls of said upwardly open recess of said support bracket including a flat surface adapted to abut a corresponding flat surface of a groove in said shaft, whereby to prevent rotation of said shaft in said upwardly open recess, the inner diameter of said arcuate portion of said retainer clip being so dimensioned relative to the outer diameter of said shaft that said retainer clip has a "loose fit" on said shaft, whereby to provide sufficient slack in said arcuate portion of said retainer clip to permit said lug portions of said clip to move laterally inwardly toward each other sufficiently to be able to move lengthwise along the interior of said upwardly open recess of said support bracket in either an inward or an outward direction relative to said recess and to clear the mouth of said recess upon the installation of or removal of said shaft and said retainer clip relative to said support bracket.

12. The combination defined in claim 11 in which the portion of the periphery of said shaft about which said arcuate portion of said retainer clip is positioned in encircling relation includes and exceeds the lower half of said shaft.

13. The combination defined in claim 12 in which said arcuate portion extends for approximately 270° about the periphery of said shaft.

14. The combination defined in claim 11 in which said retention clip is so located on said shaft that when said shaft is positioned in said upwardly open recess of said support bracket said arcuate portion of said retention clip is located on one axial side of said support bracket, and said lug portions extend from said arcuate portion axially of said shaft across said support bracket within said retention grooves and to the other axial side of said support bracket, said lug portions being in overlying and retaining relation to said shaft both inboard of and outboard of said support bracket.

15. The combination defined in claim 11 in which the surfaces of said support bracket at the mouth of said upwardly open recess are bevelled to define cam surfaces which cam said laterally spaced lug portions of said retention clip laterally inwardly toward each other and into said upwardly open recess upon the installation of said shaft and of said retainer clip relative to said support bracket.

16. The combination defined in claim 11 in which each of said axially extending lug portions includes abutment means engageable with said support bracket whereby to locate said retention clip at a predetermined approximate location on said shaft by limiting any axial movement of said retention clip along said shaft to a predetermined distance.

17. The combination defined in claim 11 in which each of said lug portions is provided with an upstanding portion, the upstanding portions of the two laterally spaced lug portions being squeezable toward each other to move said lug portions laterally inwardly toward each other sufficiently to permit said lug portions to be able to move lengthwise along said upwardly open recess in either an inward or an outward direction relative to said recess and to clear the mouth of said recess upon the installation of or removal of said shaft and said retainer clip relative to said support bracket.

18. The combination defined in claim 11 in which said stationary shaft is the shaft of a belt conveyor idler roll assembly.

19. A retention clip for retaining a shaft member against upward movement in an upwardly open recess of a support bracket and in which a retention groove is provided in each of the oppositely disposed bounding walls of said recess of said support bracket contiguous the upper portion of each of said opposite walls, said retention clip being formed of spring-like material, said retention clip comprising an arcuate portion adapted to be positioned in encircling relation to a portion of the periphery of said shaft, said retention clip comprising a pair of laterally spaced lug portions respectively adapted to extend in a direction axially of said shaft from circumferentially opposite ends of said arcuate portion of said retention clip, said lug portions being adapted to snap into the respective retention grooves of said oppositely disposed bounding walls of said recess when said shaft is positioned in said recess, whereby said lug portions of said retention clip axially overlie oppositely positioned upper surface portions of said shaft when said shaft is positioned in said recess to thereby prevent upward movement of said shaft in said recess.

20. A retention clip as defined in claim 19 in which the portion of the periphery of said shaft about which said arcuate portion of said retainer clip is adapted to be positioned in encircling relation includes and exceeds the lower half of said shaft.

21. A retention clip as defined in claim 20 in which said arcuate portion is adapted to extend for approximately 270° about the periphery of said shaft.

22. The combination defined in claim 19 in which the inner diameter of said arcuate portion of said retainer clip is so dimensioned relative to the outer diameter of said shaft that said retainer clip has a "loose fit" on said shaft, whereby to provide sufficient slack in said arcuate portion of said retainer clip to permit said lug portions of said clip to move laterally inwardly toward each other sufficiently to be able to move along the interior of said upwardly open recess of said support bracket in either an inward or an outward direction relative to said recess and to clear the mouth of said recess upon the installation of or removal of said shaft and said retainer clip relative to said support bracket.

23. The combination defined in claim 19 in which each of said axially extending lug portions includes abutment means adapted to engage with said support bracket whereby to locate said retention clip at a predetermined region on said shaft by limiting any axial movement of said retention clip along said shaft to a predetermined distance.

24. The combination defined in claim 19 in which each of said lug portions is provided with an upstanding portion, the upstanding portions of the two laterally spaced lug portions being squeezable to move said lug portions laterally inwardly toward each other sufficiently to permit said lug portions to move lengthwise along the interior of said upwardly open recess in either an inward or outward direction relative to said recess and to clear the mouth of said recess upon the installation of or removal of said shaft and said retainer clip relative to said support bracket.

* * * * *